United States Patent
Sarmah et al.

(10) Patent No.: US 9,864,605 B2
(45) Date of Patent: Jan. 9, 2018

(54) MULTISTAGE BOOT IMAGE LOADING BY CONFIGURATION OF A BUS INTERFACE

(71) Applicant: Xilinx, Inc., San Jose, CA (US)

(72) Inventors: Mrinal J. Sarmah, Hyderabad (IN); Bokka Abhiram Sai Krishna, Hyderabad (IN); Anil Kumar A V, Hyderabad (IN)

(73) Assignee: XILINX, INC., San Jose, CA (US)

( * ) Notice: Subject to any disclaimer, the term of this patent is extended or adjusted under 35 U.S.C. 154(b) by 106 days.

(21) Appl. No.: 14/931,037

(22) Filed: Nov. 3, 2015

(65) Prior Publication Data

US 2017/0123815 A1    May 4, 2017

(51) Int. Cl.
| | |
|---|---|
| *G06F 9/00* | (2006.01) |
| *G06F 15/177* | (2006.01) |
| *G06F 9/44* | (2006.01) |
| *G06F 13/40* | (2006.01) |
| *G06F 13/42* | (2006.01) |

(52) U.S. Cl.
CPC ........ *G06F 9/4408* (2013.01); *G06F 13/4068* (2013.01); *G06F 13/4282* (2013.01)

(58) Field of Classification Search
CPC . G06F 9/4408; G06F 13/4068; G06F 13/4282
USPC .......................................................... 713/2
See application file for complete search history.

(56) References Cited

U.S. PATENT DOCUMENTS

| | | | |
|---|---|---|---|
| 7,328,335 B1 * | 2/2008 | Sundararajan | G06F 15/7867 710/8 |
| 8,352,898 B1 | 1/2013 | Kellermann | |
| 2006/0184296 A1 * | 8/2006 | Voeller | G01B 11/275 701/31.4 |
| 2007/0260868 A1 | 11/2007 | Azzarello et al. | |
| 2010/0077194 A1 * | 3/2010 | Zhao | G06F 9/4401 713/2 |
| 2012/0102305 A1 | 4/2012 | Liang et al. | |
| 2013/0124840 A1 | 5/2013 | Diluoffo et al. | |
| 2013/0325998 A1 * | 12/2013 | Hormuth | G06F 15/17331 709/212 |

OTHER PUBLICATIONS

Abhiram Sai Krishna, Bokka et al., "Zynq-7000 AP SOC Secondary Boot Over PCIe Techtip," Xilinx Wiki, http://www.wiki.xilinx.com, Apr. 2, 2015, pp. 1-7.

* cited by examiner

*Primary Examiner* — Nitin Patel
(74) *Attorney, Agent, or Firm* — LeRoy D. Maunu (57) ABSTRACT

An integrated circuit (IC) that includes a processor circuit can be booted by receiving, using a storage interface circuit of the IC, a first boot image from a nonvolatile memory chip. The first boot image is executed on a processor circuit of the IC to configure a bus interface module that is designed to communicate with a host device over a communication bus that links multiple devices and the IC. Using the bus interface module, a second boot image is received from the memory of the host device to a memory of the IC. The IC is booted by executing the second boot image.

19 Claims, 7 Drawing Sheets

MULTISTAGE BOOT IMAGE LOADING BY CONFIGURATION OF A BUS INTERFACE

TECHNICAL FIELD

The disclosure generally relates to loading of boot images, and more particularly to loading boot images for integrated circuit devices in multiple stages.

BACKGROUND

There are a variety of different applications that can use memory circuits including, but not limited to, programmable logic devices (PLDs). PLDs are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet, and so forth.

Some PLDs include enough components and functionality to effectively serve as an entire computer system on a single IC chip. PLDs with such functionality are sometimes referred to as a system on a chip (SOC). An SOC can include one or more processor circuits that execute software instructions in order to carry out different functions. Upon startup (e.g., hard-power on or hard reset), some of the earliest set of instructions executed by the SOC provide instructions for how to boot the SOC. For instance, the SOC can first execute a boot read only memory (ROM) that configures the SOC to load a first-stage boot loader (FSBL) image. The FSBL instructions can specify how peripheral functional blocks of the SOC are configured, control and implement a configuration bitstream, setup and run the operating system (OS), and other boot-related functions. Often, the boot image for an SOC can be loaded from a non-volatile memory, such as a read only memory (ROM) circuit.

As the size of the boot image used by SOCs increases, the size of the storage location for the boot image also increases. The time required to load the boot image can also increase. Thus, the time before the SOC is fully-configured and operational can increase. The increased load time can be problematic in instances where it is desirable to have the SOC be available quickly, whether upon power-up or in similar situations. These and other problems can be problematic for SOC design and their use.

SUMMARY

Certain implementations are directed toward a method for booting an integrated circuit (IC) that includes a processor circuit. The method can include receiving, using a storage interface circuit of the IC, a first boot image from a nonvolatile memory chip. A bus interface module can be configured by executing the first boot image on a processor circuit of the IC. The bus interface module can be designed to interface between a host device over a communication bus that links multiple devices and the IC. The bus interface module can be used to communicate a second boot image from the memory of the host device to a memory of the IC. The IC can be booted by executing the second boot image.

According to various implementations, a system includes an IC. The IC includes a bus interface module that is configured to communicate with a host device over a communication bus that links multiple devices to the IC. A storage interface circuit is configured to receive a first boot image from a nonvolatile memory chip. A processor circuit is configured to execute the first boot image to configure the bus interface module to communicate a second boot image from a memory of the host device to the IC; and to boot the IC by executing the second boot image.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward a system that is configured to use a serial bus interface (e.g., PCIe) module to load a boot image (e.g., FSBL, SSBL, or both). The boot process can be split into multiple boot stages such that an early stage can be used to configure the serial bus interface module and the programmable logic device. During a subsequent stage, a boot image can be loaded from an external source over the serial bus interface module. In certain implementations, the serial bus interface can use a protocol that provides a level of security against third-parties wishing to read data contained in the boot image (e.g., using encoding and/or data scrambling techniques). Various implementations can take advantage of high throughput resulting from the use of the high speed serial interface.

For implementations where the serial bus interface is PCIe, the data transferred over a PCIe link can be scrambled and 8B/10B encoded, which makes it difficult for an external intruder to easily decode the serial stream. For example, external intrusion may require that a PCIe link partner is inserted in the serial data path. Moreover, a PCIe interface can be configured to provide relatively-high speed data transfer (e.g., 2.5 Gbps, 5 Gbps and 8 Gbps per lane and depending on the PCIe generation used). The high speed data transfer can be particularly useful for providing fast loading of a boot image and for speeding up the entire boot process.

In some implementations, the early stage, that configures the serial bus interface, can be carried out entirely from within the boot ROM, while the second stage can be transferring the entire FSBL image. Thus, the boot ROM can contain instructions for configuring an SOC processor circuit and a serial bus interface module to transfer the entire FSBL boot image used for the FSBL process.

In certain implementations, the early stage can include executing the boot ROM image as well as the FSBL image, and the second stage can include the transfer of a boot image used for a second stage bootloader (SSBL) process. The first portion of the boot image can contain the instructions for configuring an SOC processor circuit and a serial bus interface module to transfer the SSBL boot image during a subsequent stage.

In certain implementations, the first stage can contain sufficient configuration data to setup and configure a bus interface module that is designed to interface with a host device over a communication bus that links multiple devices together. The system can then load the boot image (in whole or in part) through the bus interface module. In this manner, the second stage transfers the boot image between a circuit that stores the boot image and the SOC. The SOC can then execute the instructions contained within the boot image to continue with the boot process.

According to various implementations, the bus interface module can be configured to communicate using a high speed serial bus protocol that is based upon a point-to-point topology and a packet-based protocol. A point-to-point topology can use a number of dedicated connections between devices, while a shared bus topology can use connections that are shared with three or more devices. Packet-based communication protocols allow for data to be transmitted in separate (small) blocks to a destination specified in each packet. As might be necessary, the packets for a particular communication stream can be reassembled upon receipt at the destination.

A particular example of a point-to-point topology that uses packets is Peripheral Component Interconnect Express (PCIe). For ease of discussion, various implementations will be discussed in the context of PCIe; however, it is understood that other protocols, topologies, and configurations are also possible.

In certain implementations, size of the data corresponding to the early stage can be kept relative small, e.g., so as to meet one or more design constraints. The design constraints can include, but are not necessarily limited to, a size of a boot ROM memory circuit, and meeting a desired load time for the early stage instructions. In various instances, the instructions for the early stage can be stored in a memory circuit that is accessible over a default/configuration interface of the programmable IC (PLD/FPGA). The interface to the memory circuit can be implemented using circuitry in the programmable IC that is available upon power-up and without first being configured. This type of interface can sometimes be referred to as a hard interface. For instance, the first set of configuration data (e.g., the Boot ROM image and possibly the FSBL image) can be stored in a persistent memory circuit, such as a flash memory circuit. Accordingly, the size of the configuration data for the first stage can be kept small enough to allow the configuration data to be loaded using the hard interface and the later portion of the boot image to be available on the bus.

Consistent with various implementations, the programmable IC can be configured to operate as an endpoint (EP) device and the source of the second stage image can be a host device. For instance, the high speed bus can be PCIe, the programmable IC can be a SoC that functions as a PCIe EP device, and the source of the second stage can be a remote computer with a central processing unit (CPU) and that is configured as the PCIe root complex (host). The EP device can act as a PCIe slave that is controlled by the remote CPU. If the SoC is a multiprocessor (MP) device, the host CPU can control application processing units (APUs), which can control the booting and co-processing functions of the MPSoC.

Figure 1:
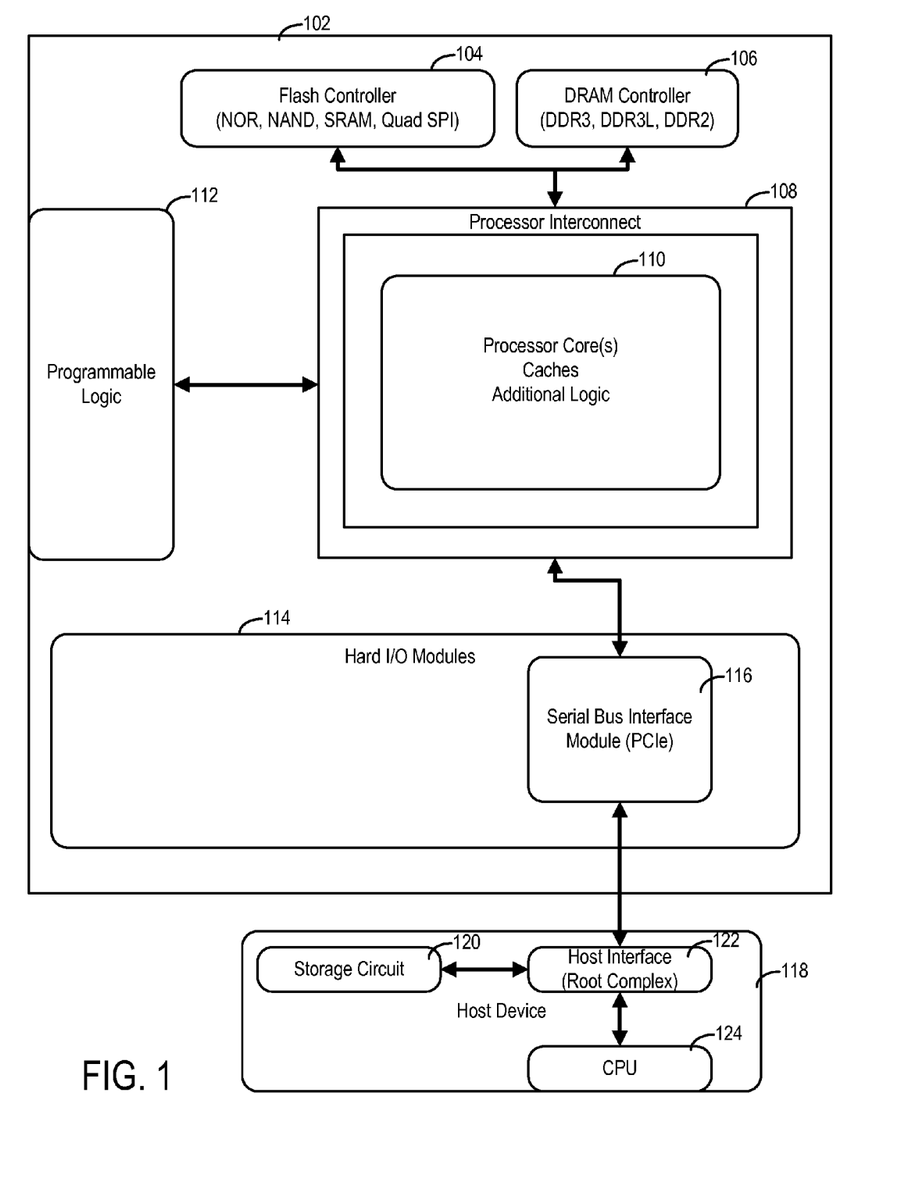
FIG. 1 depicts a block diagram of a system for transferring boot image data using a serial bus, consistent with certain implementations.

Turning now to the figures, FIG. 1 depicts a block diagram of a system for transferring boot image data using a serial bus, consistent with certain implementations. The block diagram includes a SoC device 102 with a number of circuit components. The particular SoC architecture shown in FIG. 1 is provided as an example. It is understood that a number of different SoC architectures can be used in conjunction with aspects and functions discussed herein. SoC device 102 is depicted as including one or more processor core(s) 110. The processor cores can also include caches and other logic circuitry. As discussed herein, SoC device 102 can include one or more APUs. In certain implementations, one of the APUs can be configured for use as a boot processor.

A processor interconnect 108 can provide an interface between the processor core(s) 110 and various other interface circuits. These additional circuits can include storage interface circuits, such as flash controller logic circuit 104 that is configured to load a first boot image upon powerup of the SoC from non-volatile memory circuits (e.g., flash memory circuits). DRAM controller logic circuit 106 can be configured to provide access to dynamic memory circuits. The dynamic memory circuits can include, but are not limited to, dynamic random access memory (DRAM) circuits that are configured to operate consistent with different versions of double-data rate (DDR) (e.g., DDR2, DDR3, DDR3L). Other types of RAM circuits are also possible.

Programmable logic circuit block 112 can include several different types of programmable logic blocks that are arranged in an array. For example, the programmable logic can include a large number of different programmable tiles such as multi-gigabit transceivers (MGTs), configurable logic blocks (CLBs), random access memory blocks (BRAMs), input/output blocks (IOBs), configuration and clocking logic, digital signal processing blocks, specialized input/output blocks, for example, clock ports, and other programmable logic such as digital clock managers, analog-to-digital converters, system monitoring logic, and so forth. It is noted that various SoC architectures might not include programmable logic. For ease of discussion various embodiments are discussed in the context of a SoC with programmable logic, however, the corresponding embodiments are not necessarily limited thereto.

Consistent with certain implementations, the SoC device 102 can include one or more additional hard input/output (I/O) interface modules 114. These I/O interface modules can be hard interface modules that are implemented using circuitry in the programmable IC that is available upon power-up and without first being configured in the programmable logic from a corresponding bitstream. The hard I/O interface modules 114 can include one or more serial bus interface modules 116 (e.g., a PCIe interface module). As discussed in more detail herein, the presence of a hard PCIe interface module can be particularly useful for allowing first stage boot loader (FSBL) images to be loaded over PCIe. In various implementations, a soft PCIe interface module can be used by configuration of logic in the programmable logic circuit block 112. As also discussed in more detail herein, the use of software PCIe interface modules can be useful for loading of second stage boot loader (SSBL) images; after the FSBL has been first used to configure the PCIe interface module within the programmable logic.

The serial bus interface module 116 can be configured to communicate with a (remote) host device 118. The host device 118 can be implemented using a variety of different computer systems including, but not limited to, an X-86 computer system. Host device 118 can include a CPU 124, a host interface module 122 and a storage circuit 120. According to various implementations, the host interface module 122 can control data flow between the host device and the SoC, which can function as a slave device. In a PCIe implementation, the host interface module 122 can function as the root complex of the PCIe hierarchy.

According to various implementations, a software driver running on CPU 124 can initiate and control the transfer of the second portion of the boot image, for use for the FSBL process. As discussed herein, the transfer can involve the use of a handshake protocol that indicates, to the SoC, when the transfer has started and when the transfer has completed. The SoC can execute a software driver that is also configured to use the handshake protocol, and the execution of the second portion of the boot image upon completion of the transfer.

Consistent with various implementations, initially a BootROM and then a first stage boot loader (FSBL) are executed. The PCIe link is configured and then a universal boot loader (u-boot) can be transferred from an external host machine over PCIe link to the local memory of the SoC.

Figure 2:
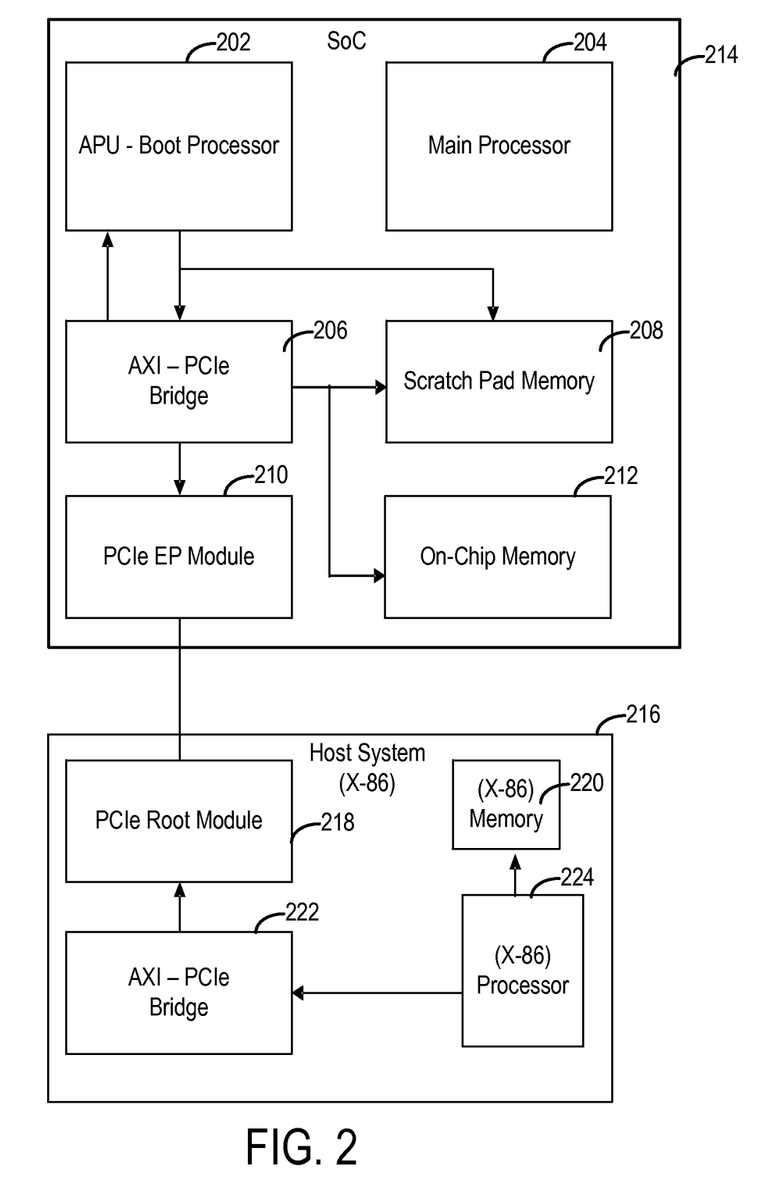
FIG. 2 depicts a block diagram of a system configured to perform FSBL or primary boot over PCIe, consistent with implementations of the present disclosure.

FIG. 2 depicts a block diagram of a system configured to perform FSBL, or primary boot, over PCIe, consistent with implementations of the present disclosure. According to certain implementations, the SoC 214 can be configured to retrieve the entire FSBL image over a PCIe interface. APU 202 can function as a boot processor that loads a boot ROM from a non-volatile memory upon powerup and otherwise helps setup the system to run using the main processor 204. The boot ROM can contain instructions that allow for initial configuration of SoC 214 including the configuration of the PCIe endpoint (EP) module 210 and the Advanced eXtensible Interface (AXI)-PCIe Bridge 206. The instructions can also set aside a portion of memory for use as scratch pad memory region 208. Once the APU 202 is ready for transfer of the FSBL image, the APU 202 can signal to the host system 216 by setting a flag in scratch pad memory region 208.

Host system 216 can include a processor circuit 224 and local memory 220. In certain implementations, the processor circuit 224 and local memory could be part of an X-86 system; however, other types of processor systems are also possible. The host system can include a PCIe root module 218 that is configured to operate as the root complex for the entire system (both for the host system 216 and for SoC 214). After startup, the PCIe root module can enumerate all PCIe endpoint devices in the overall system, including SoC 214. The enumeration process includes defining addressing mapping that allows the PCIe endpoint devices (including SoC 214) and PCIe root module to communicate.

Both APU 202 and processor circuit 224 are shown as interfacing with a bridge 206 and 222, respectively. Advanced eXtensible Interface (AXI) is an example of a local bus interface that can be used by processors; however, various implementations are not limited to the use of a specific bus interface.

According to some implementations, a software driver running on the host system 216 can be configured to detect when a flag is set in the scratch pad memory region 208. This detection can include, for example, polling the scratch pad memory region 208. The software driver can respond to detection of the flag by transferring the FSBL image to on-chip memory 212 using PCIe transactions. The software driver of the host system 216 can be configured to notify the software driver of the APU 202 that the transfer is completed. The notification to the APU 202 can be carried out using different solutions. For instance, the AXI-PCIe Bridge 206 can generate a local shared peripheral interrupt to the APU 202 once the software driver running on host system 216 has completed the transfer of the bootloader image. Alternatively the APU can monitor for the transfer completion bit in the scratch pad memory region 208. For example, the APU can periodically poll the appropriate location in memory to detect the setting of a corresponding bit (or set of bits). In some implementations, the software driver of the host system can be configured to set a flag indicating that the transfer has begun and clear the flag (or set a different flag) when the transfer completes. The software driver of the APU boot processor can detect when the transfer is completed. In response to detection of a completed transfer, the FSBL image can then be executed by the main processor.

Figure 3:
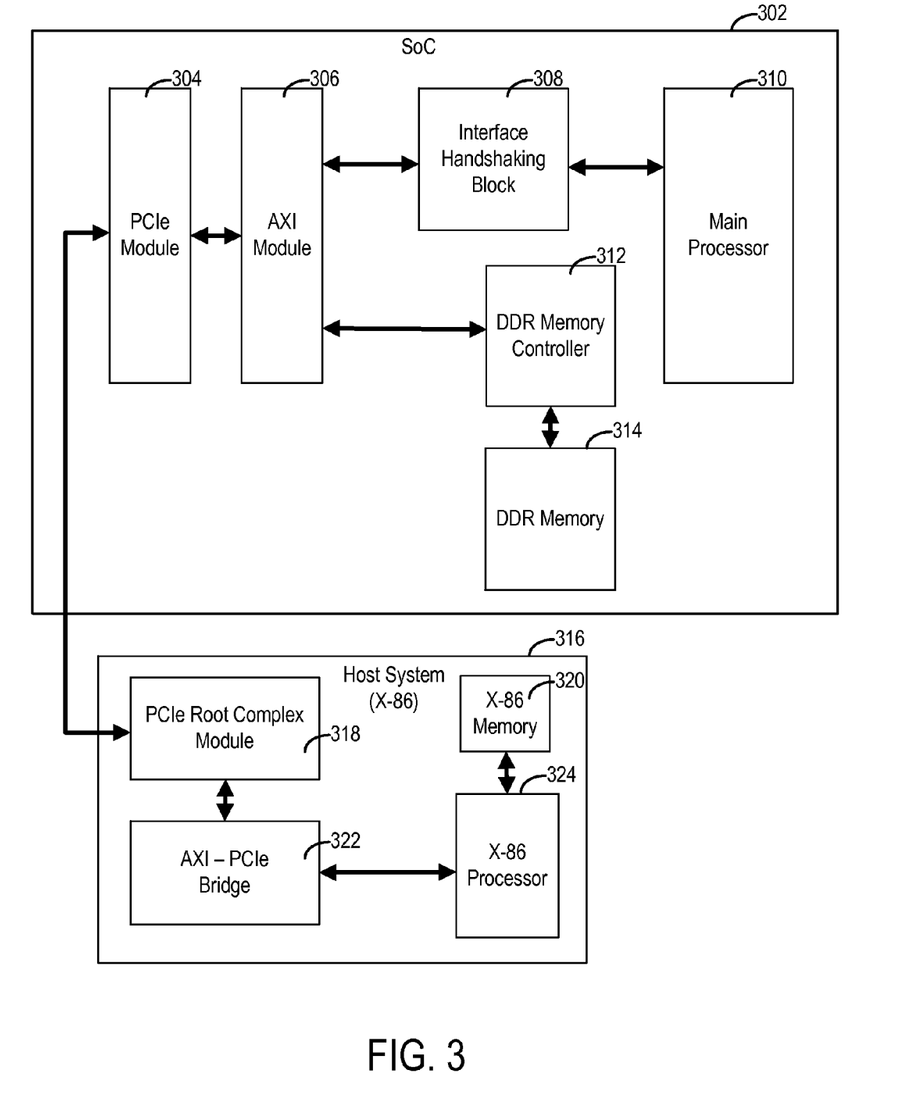
FIG. 3 depicts a block diagram of a system configured to perform SSBL or secondary boot over PCIe, consistent with implementations of the present disclosure.

FIG. 3 depicts a block diagram of a system configured to perform SSBL or secondary boot over PCIe, consistent with implementations of the present disclosure. SoC 302 can be configured to transfer a second stage boot loader (SSBL) using PCIe. SoC 302 includes a main processor 310 with a main memory circuit (e.g., DDR memory) 314 that is accessible through a memory controller circuit 312. An AXI module 306 can include logic circuitry that is designed to allow the main processor to interface with various modules and devices. For instance, the AXI module circuit can function as an AXI-PCIe bridge that communicates with the PCIe module 304.

As discussed herein, the PCIe module 304 can be a soft interface that is implemented using programmable logic. For example, the FSBL can be loaded from a nonvolatile memory circuit of the SoC 302. The FSBL can include, or access, bitstream data that is used to program the programmable logic to include the PCIe module 304. Once the PCIe module 304 is properly setup in the programmable logic hardware, the FSBL can be configured to monitor for the transfer and completion of a SSBL. For example, the FSBL might execute a software driver that implements a handshake procedure that is discussed in more detail herein.

According to certain implementations, the FSBL and corresponding bitstream can also be configured to create the interface handshaking block 308 in the programmable logic of the SoC 302.

Consistent with various implementations, the SoC 302 can be configured to operate as a PCIe endpoint device that communicates with the host system 316. The host system 316 can be configured to operate as a host device. For instance, the host device in a PCIe architecture includes a PCIe root complex module 318. The local processor circuit 324 can communicate with different PCIe endpoint devices through an AXI-PCIe bridge 322 that connects to all the PCIe endpoint devices through the root complex module 318.

In a number of implementations, the system of FIG. 3 can be configured for use with a secondary boot image that can be loaded by a SoC-based application that is started after the system initialization is done by the First Stage Boot Loader (FSBL). The loading of the secondary boot image over PCIe or a similar bus can be useful for eliminating the need to flash the corresponding application (as a secondary boot image) along with FSBL. For instance, the secondary boot image (e.g., u-boot) can be initially stored in memory 320 of the Host system 316. The image can be parsed into double words (DW) by a software driver application running on the host system 316 and then transmitted over PCIe. The DWs can be written to a predefined location in the memory 314 by the AXI module 306. In some implementations, the AXI module can include a custom logic that implements an AXI memory-mapping protocol that uses a mapping into the memory 314 to store the data received as DWs over PCIe.

At the beginning of the transfer of the secondary boot image, the application running on the main processor 310 can provide an indication that the SoC 302 is ready to receive the secondary boot image. For instance, the application running on the main processor 310 can be configured to write to a data location (register) that is mapped to the interface handshaking block 308. For example, the data location can correspond to a data register that is accessible over PCIe and through the AXI module 306. To facilitate the accessibility of the data register, a portion of the PCIe space of the PCIe module 304 can mapped to the interface handshaking block 308. The software driver running on the host system 316 can poll for status of the SoC 302 by periodically reading from this memory mapped location. In response to detecting that the data register has been written to (which indicates that the SoC 302 is ready to receive the secondary boot image) the software driver of the host system 316 can be configured to begin transferring the secondary boot image to the SoC 302 using a PCIe link between the PCIe modules 304 and 318. When the transfer of the secondary boot image is complete, the software driver of the host system 316 can be configured to write to a memory location that is mapped to the interface handshaking block 308. The interface handshaking block 308 can respond to the data write by asserting an interrupt, or by storing data in a register that can be polled by the main processor 310. Main processor 310 can then begin executing the secondary boot image (e.g., a u-boot image).

Figure 4:
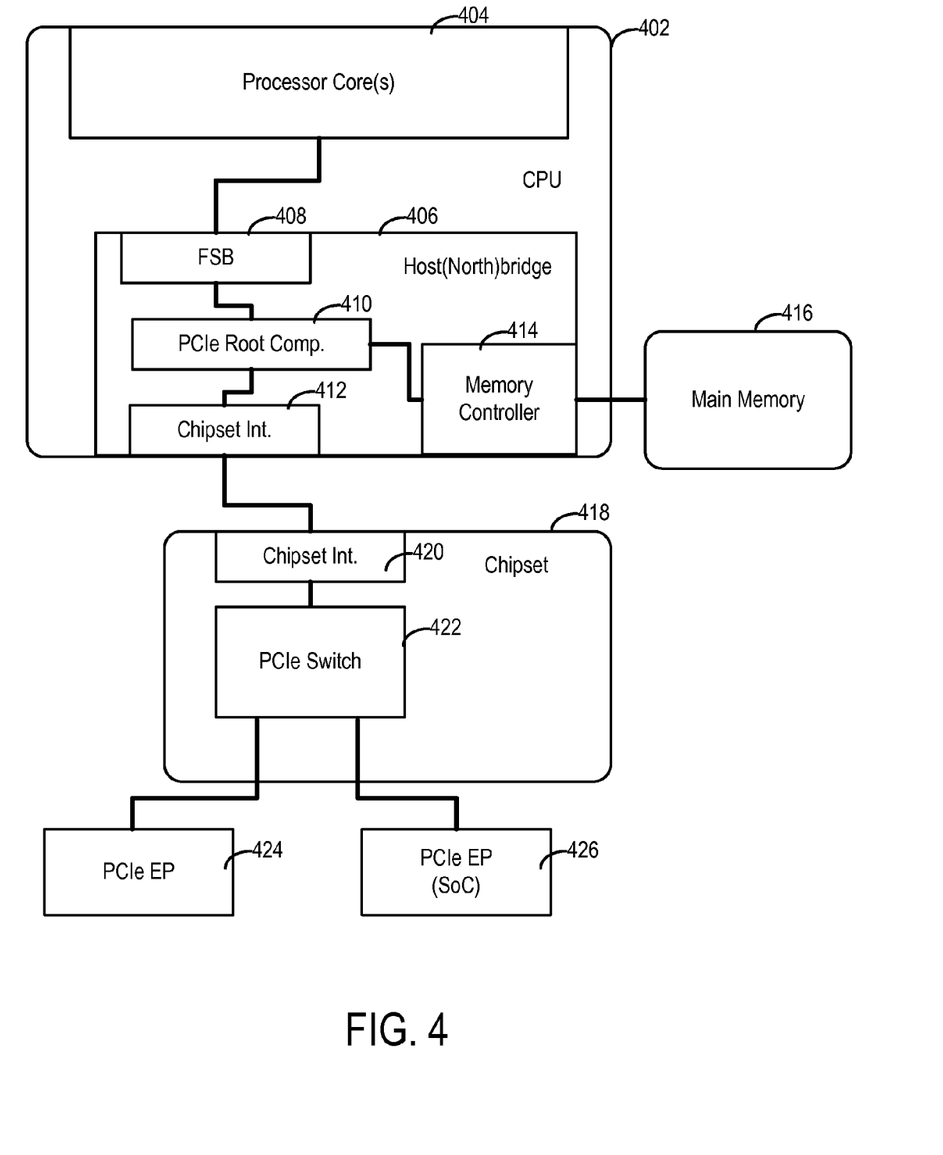
FIG. 4 depicts a system diagram of a computer system with PCIe components, consistent with various implementations.

FIG. 4 depicts a system diagram of a computer system with PCIe components, consistent with various implementations. CPU 402 includes one or more processor cores 404. A host bridge 406 (sometimes referred to as North Bridge) facilitates communications between the processor cores and other system components and includes a front-side bus (FSB) module 408 that provides an interface to the processor cores. The host bridge 406 can be configured to function as the PCIe root complex (device/module) 410. The PCIe root complex module 410 connects the PCIe device tree to main memory 416, the processor cores 404, and to other devices, such as a graphics processing unit (GPU) (not shown). While the root complex can be implemented as part of a separate physical chip from the CPU, the root complex can also be integrated into the CPU chip. Main memory 416 can be accessed using a memory controller circuit 414.

In some implementations, a chipset interface module 412 can be used to communicate with the chipset 418 using a different communication protocol (e.g., a proprietary chipset protocol). A corresponding chipset interface module 420 can provide an interface between the chipset-specific communication protocol and one or more PCIe switches 422. A number of PCIe endpoint (EP) devices 424, 426 can be accessible through the PCIe switch. Each PCIe EP can be connected to the PCIe switch through a dedicated high-speed serial connection. In this manner, the system is configured using a point-to-point topology. Moreover, data can be transmitted using a packet-based protocol. For example, the CPU can execute a software driver that encapsulates data in a set of packets that specify a destination address that corresponds to a PCIe EP. The root complex, and each subsequent module in the transmission path, can receive the packets and identify a point-to-point connection (port) using a routing table and the destination address. The packet can be transmitted on the identified port so that it can be received by the next module in the transmission path.

Consistent with the various implementations discussed herein, one or more of the PCIe EP devices 424, 426 can be implemented using programmable ICs with the primary or secondary boot image transfer solutions discussed herein.

Figure 5:
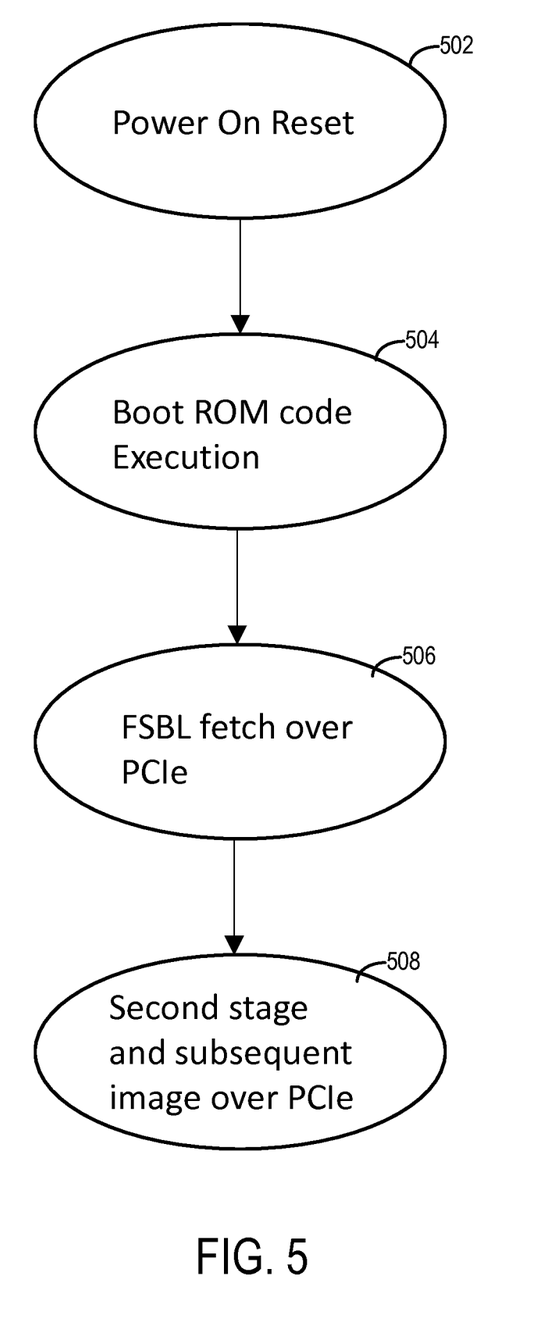
FIG. 5 depicts a flow diagram for use with a system for transferring FSBL images using a configuration serial data bus, consistent with certain implementations.

FIG. 5 depicts a flow diagram for use with a system for transferring FSBL images using a configuration serial data bus, consistent with certain implementations. The flow begins with a power on reset event, per block 502. The power on reset event can occur, for example, after a host system and a SoC endpoint device are provided with operating power. The host system can maintain a reset condition until it reaches a certain point within its boot cycle.

When the SoC endpoint device is released from the reset condition by the host system, it can retrieve and begin executing boot ROM code, per block 504. The boot ROM code can be stored, for instance, in a local nonvolatile memory circuit such as a flash memory circuit, a PROM, or similar storage circuit. Consistent with various implementations, the boot ROM can include instructions that are designed to manage the early boot process, e.g., by selecting the boot medium and loading the FSBL image. As discussed herein, the boot ROM code can include instructions that configure a local serial bus module or interface, such as a hard PCIe interface module. Accordingly, the FSBL image can be loaded using PCIe, or similar bus protocols, per block 506. The FSBL can carry out important early system initialization functions, such as setting the PLL coefficients. Subsequent information, including the SSBL can also be transferred using PCIe, per block 508.

Various bus protocols provide a number of different advantages for transferring FSBL and SSBL images. For instance, PCIe has a relatively fast data transfer rate (e.g., up to 20 Gbps serial throughput for an x4Gen2 configuration) and, even with overhead of 8B/10B encoding, the effective throughput can be high (e.g., up to 16 Gbps). The use of a fast communication bus can provide for fast transfer times even for large boot images. PCIe also allows for the use of a quality of service (QoS) option that provides a guarantee on transfer time by providing priority to certain data transactions. The QoS option can therefore be enabled to provide a known latency in the boot image transfer timings. Moreover, PCIe scrambles serially transmitted characters and uses 8B/10B encoding. Scrambling the data can frustrate attempts to read the transmitted data by a third party, which might attempt to snoop bus transactions with an external probe, for example. Thus, the use of PCIe can provide security improvements. Moreover, the use of PCIe opens the door for remote upgrading of the transferred boot image. For instance, Ethernet interfaces can be used to update the image(s) of the host device. Upon a subsequent boot of the system, the newly updated image can be deployed. In certain implementations, the authenticity of an updated image can be verified using, for example, digital signatures, encryption, and other authentication solutions and combinations thereof.

Figure 6:
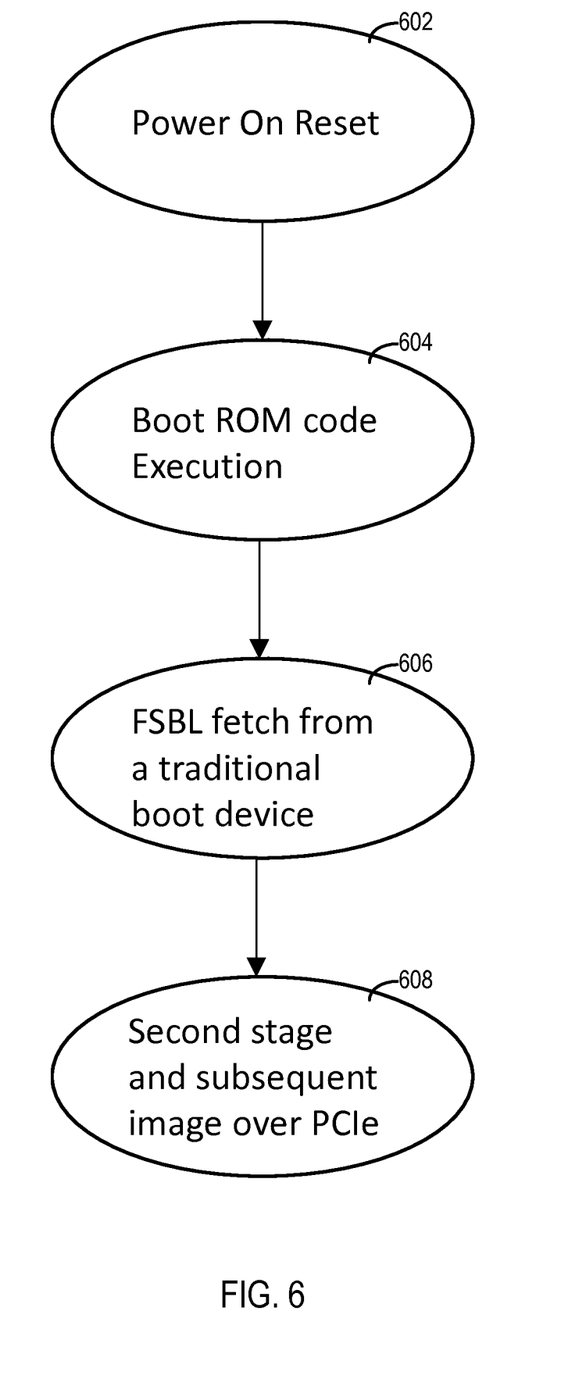
FIG. 6 depicts a flow diagram for use with a system for transferring secondary boot images using a configuration serial data bus, consistent with certain implementations.

FIG. 6 depicts a flow diagram for use with a system for transferring secondary boot images using a configuration serial data bus, consistent with certain implementations. The flow diagram begins with a power on reset event occurring, per block 602. When the SoC endpoint device is released from the reset condition by the host system, it can retrieve and begin executing boot ROM code, per block 604. The ROM code can provide instructions (where and how) for retrieving the FSBL image, per block 606. For instance, the FSBL image can be retrieved from a local storage circuit (e.g., a flash memory circuit or a PROM memory circuit).

According to various implementations, the FSBL image can include instructions for configuring a local serial bus module or interface, such as a hard PCIe interface module of the SoC. Accordingly, the SSBL image can be loaded using PCIe, or similar bus protocols, per block 608. A particular example of a SSBL is u-boot. U-boot stands for "universal bootloader" and is an open source bootloader that can be used in embedded devices and for the purpose of booting an operating system, such as Linux.

Figure 7:
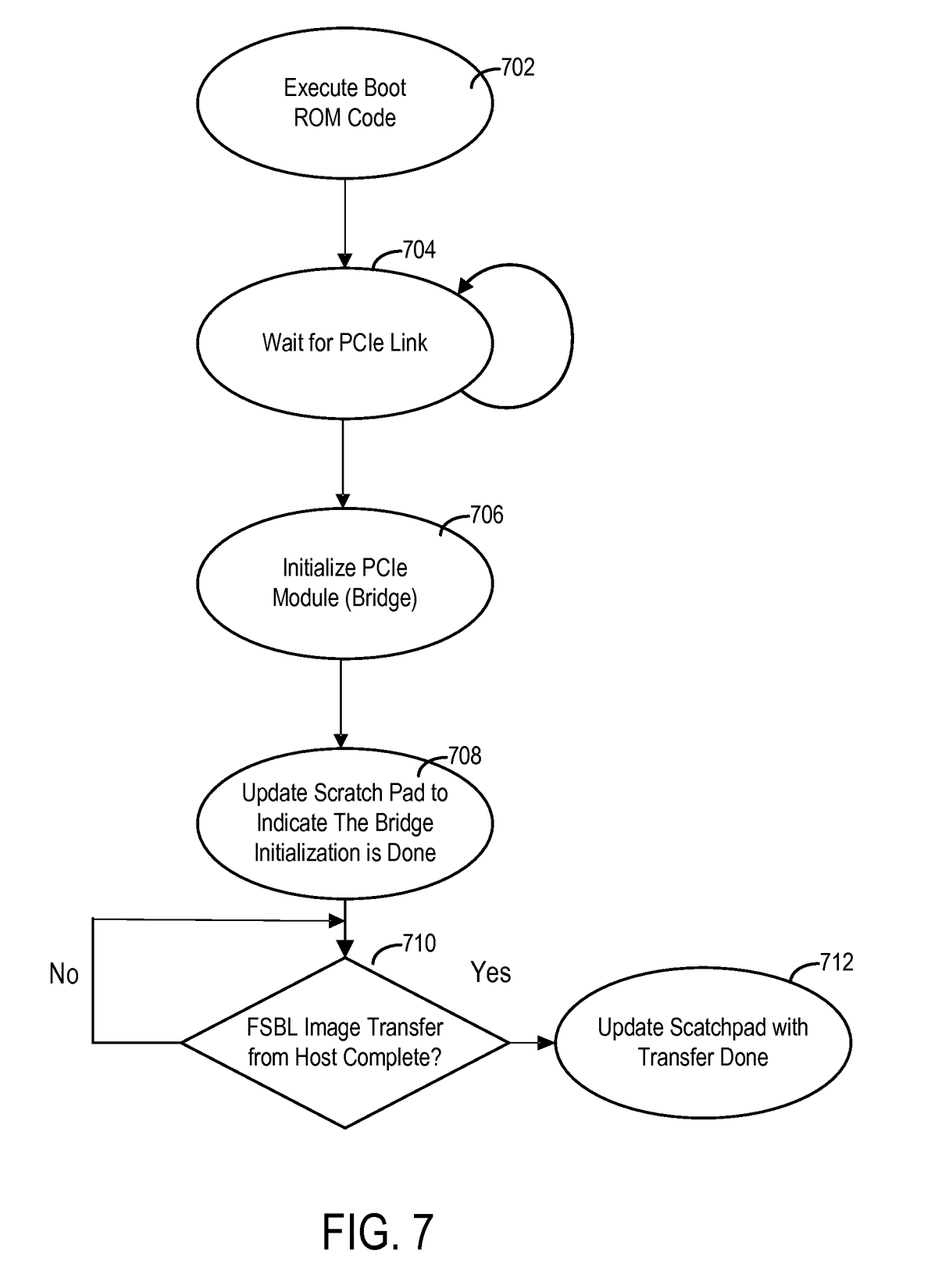
FIG. 7 depicts a flow diagram for a handshake process useful in the context of transferring FSBL images using a PCIe link, consistent with certain implementations.

FIG. 7 depicts a flow diagram for a handshake process useful in the context of transferring FSBL images using a PCIe link, consistent with certain implementations. The boot ROM code can begin execution, per block 702. The boot ROM code can be loaded from a local storage circuit, and the execution of the boot ROM code can allow the SoC to have low-level aspects configured and to begin execution of an application that monitors, and waits for, a link to be established between a local PCIe module and a PCIe root complex of a host device, per block 704. The linking can occur once the host device has enumerated the PCIe endpoint devices in the system. The enumeration process includes defining addressing mapping that allows the PCIe endpoint devices and PCIe root complex module to communicate.

Once a link has been established, the PCIe modules of the system can be initialized and configured, per block 706. The process corresponding to block 706 can include the initialization and configuration of any PCIe bridges between the root complex and the memory and main processor of the endpoint device. For example, the PCIe bridges can have an address range that is mapped to a first portion of the local memory that is used as a scratch pad and another address range that is mapped to a second portion of the endpoint device that is used to store the FSBL image. Once the PCIe modules are initialized and properly configured, the main processor of the SoC endpoint device can update a location of the scratch pad memory that indicates the SoC endpoint device is ready to receive the FSBL image, per block 708.

An application/driver running on the host device can detect that the location of the scratch pad memory has been updated to indicate that the FSBL image can be transferred. As indicated by block 710, the driver can determine when the FSBL image transfer is complete. Upon determining that the FSBL image transfer is complete, the driver can update a second location within the scratch pad memory to indicate that the transfer has been completed, per block, 712. The FSBL image can then be executed by the SoC endpoint upon detecting the indication in the scratch pad memory. Additional images, such as an SSBL image, can be transferred using the same (or similar) process as described in connection with FIG. 7.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. A method for booting an integrated circuit (IC) that includes at least one processor circuit, the method comprising:
   receiving, using a storage interface circuit of the IC, a first boot image from a nonvolatile memory chip;
   configuring, by executing the first boot image on a processor circuit of the IC, a bus interface module that is designed to communicate with a host device over a communication bus that links multiple devices to the IC that is a bus endpoint device;
   communicating, using the bus interface module, a second boot image from a memory of the host device to a memory of the IC via a root complex module of the host device; and
   booting the IC by executing the second boot image on the processor circuit.

2. The method of claim 1, wherein the bus interface module is further designed to communicate with the host device using a packet-based protocol and over a point-to-point link between the host device and the IC.

3. The method of claim 2, wherein the packet-based protocol defines packets that encapsulate data and specify a destination address.

4. The method of claim 1, further comprising implementing a handshake protocol with the host device to provide the second boot image and the processor circuit of the IC.

5. The method of claim 4, further comprising:
   loading a boot read only memory (ROM) image; and executing the boot ROM image to instruct the IC to receive the first boot image.

6. The method of claim 1, wherein the communication bus is a Peripheral Component Interconnect Express (PCIe) communication bus and wherein the IC includes programmable logic tiles.

7. The method of claim 6, further comprising setting a value in scratch pad memory space in response to completion of the enumeration of the bus interface module.

8. The method of claim 1, wherein in a first stage, the first boot image is a boot read only memory (ROM) image and in a second stage, the second boot image is a First Stage Boot Loader (FSBL) image.

9. The system of claim 1, wherein the first boot image is a First Stage Boot Loader (FSBL) image and the second boot image is a Second Stage Boot Loader (SSBL) image.

10. A system comprising:
an IC that includes:
  a bus interface module that is configured to communicate with a host device over a communication bus that links multiple devices to the IC as a bus endpoint device;
  a storage interface circuit configured to receive a first boot image from a nonvolatile memory chip;
  a processor circuit configured to:
    execute the first boot image to configure the bus interface module to transfer a second boot image from a memory of the host device to the IC via a root complex module of the host device; and
    boot the IC by executing the second boot image.

11. The system of claim 10, wherein the bus interface module is further designed to communicate with the host device using a packet-based protocol and over a point-to-point link between the host device and the IC.

12. The system of claim 11, wherein the packet-based protocol defines packets that encapsulate data and specify a destination address.

13. The system of claim 10, wherein the processor circuit is further configured to implement a handshake protocol with the host device providing the second boot image.

14. The system of claim 13, wherein the storage interface circuit is further configured to load a boot read only memory (ROM) image; and
  wherein the boot ROM image includes instructions for the IC to perform the receiving of the first boot image from the nonvolatile memory chip.

15. The system of claim 10, wherein the communication bus is a Peripheral Component Interconnect Express (PCIe) communication bus and wherein the IC includes programmable logic tiles.

16. The system of claim 15, wherein the processor circuit is configured to configure the bus interface module as part of an enumeration process for the PCIe communication bus.

17. The system of claim 16, wherein the processor circuit is configured to set a value in scratch pad memory space in response to completion of the enumeration of the bus interface module.

18. The system of claim 15, wherein the bus interface module is configured to use 8B/10B encoding.

19. The system of claim 10, wherein the first boot image is a First Stage Boot Loader (FSBL) image and the second boot image is a Second Stage Boot Loader (SSBL) image.

* * * * *